United States Patent Office 2,767,055
Patented Oct. 16, 1956

2,767,055

COBALTIC PENTAMMINE SULFATE SEPARATION

Felix Alfred Schaufelberger, Yonkers, N. Y., assignor to Chemical Construction Corporation, New York, N. Y., a corporation of Delaware No Drawing. Application December 23, 1953, Serial No. 400,112

4 Claims. (Cl. 23—117)

This invention relates to hydrometallurgy of cobalt and nickel. More particularly it is concerned with the separation of these metals one from the other when both are contained in the same liquor. Still more particularly, it involves a new method of obtaining a substantially nickel-free cobalt solution from liquors containing the mixed soluble salts of both metals.

Nickel and cobalt metals and their naturally-occurring minerals are very similar to one another in both physical and chemical properties. Moreover both metals generally occur together in their natural deposits and cannot be separated by conventional ore dressing methods. For these reasons, both metals are generally present, in varying amounts, in all solutions that result from any type of leaching of either nickel or cobalt natural or intermediate products.

In conventional metallurgy of either nickel or cobalt, the presence of relatively large quantities of the minor metal in the ores and concentrates of the major one has always been a serious and difficult problem. When small amounts of cobalt are present in nickel concentrates, most of that cobalt is discarded in the slag from nickel smelting. The remainder is sold in the nickel bullion or cathodes as nickel metal. Very little is recovered and sold as cobalt metal primarily because the cost of separation by present methods is at least as great as the additional value of the cobalt metal.

When small amounts of nickel are present in cobalt concentrates and therefore in the cobalt solutions this nickel is generally either discarded at considerable loss or is recovered with the cobalt. In the latter case, the nickel becomes an impurity in the cobalt metal, and the producer is generally not paid for it. In some cases, certain nickel and cobalt mixed metals are marketable as such, but usually at a price below the value of the pure metals in separate products.

It is apparent therefore that a process for the efficient separation of cobalt and nickel into separate products would be very useful in both nickel and cobalt metallurgy.

Many processes have been either proposed or used for the treatment of liquors containing dissolved cobalt and nickel salts. Most of these involve the oxidation of cobalt to cobaltic hydroxide, while the liquor is being partially neutralized with an alkali. Cobalt is easier to oxidize, and the resulting cobaltic salt will hydrolyze and precipitate from a slightly more acidic solution than will the parallel nickel hydroxide.

There have been also suggested several methods of separating nickel and cobalt from ammonium carbonate leach liquors. Most of these involve fractional distillation of the ammonium carbonate. The mother liquor, at different stages in the process, thereby becomes concentrated with either nickel or cobalt. This liquor may then be removed and treated separately. The residue may be redissolved and retreated separately.

The above types of processes for the production of nickel or cobalt result in products containing relatively large amounts of the other metal respectively. This relatively poor separation is probably due to the fact that the separations are made by precipitation of hydroxide or basic carbonate solids. These solids always occlude or absorb large quantities of the solution from which they are precipitated.

More recently there have been several new separation procedures suggested. One such procedure comprises recovering cobalt as cobaltic hexammine sulfate. The procedure comprises adjusting the solids content of the liquor to provide at least sufficient ammonia to form cobalt hexammine and at least sufficient anions to satisfy the cobalt in its trivalent state. The adjusted solution is then oxidized and heated to about 250° F. to precipitate a yellow-orange crystalline cobaltic ammine salt, substantially free of nickel. This procedure provides for an excellent separation and produces a high purity cobalt product even when treating liquors having low cobalt to nickel ratios. It, however, is not particularly satisfactory for liquors having high cobalt to nickel ratios since it involves separating the major metal constituent of the liquor in solid form. In addition, it requires high ammonia concentrations to insure formation of the hexammine as well as high temperatures and pressures.

Another recently suggested procedure for effecting a nickel-cobalt separation comprises high temperature reduction with hydrogen in which nickel in the form of nickel ammine complexes is preferentially reduced with respect to cobalt. This may then be followed by reduction of the cobalt. While products of excellent purity are also obtained in this method it also has the disadvantages that it requires high temperatures and pressures and is preferably applied to liquors having high nickel to cobalt ratios.

Still another of these new procedures comprises treating a nickel cobalt liquor at room temperature with carbon dioxide whereby cobalt carbonate is precipitated. This provides cobalt products of satisfactory purity particularly from liquors having high cobalt to nickel ratios. Cobalt carbonate moreover is easily calcined and reduced to obtain a metal product. However, the problem created by the necessity for handling large volumes of carbon dioxide is a disadvantage.

It is therefore the primary object of this invention to provide an improved method for the separation of cobalt from nickel. It is a further object of this invention to obtain this cobalt and nickel separation in the form of products which may be readily processed to cobalt and nickel metal powders. Such a method should be capable of treating cobalt and nickel containing ores or concentrates irrespective of the cobalt to nickel ratio whereby an effective separation is obtained. Such a process should preferably be operable at normal conditions of temperature and pressure. It should involve only the use of reasonable amounts of commonly available chemical reagents which may be either readily regenerated or sold as by-products of the process.

Considering the many methods which have in the past been suggested for effecting separation of cobalt and nickel from ores and concentrates, the process of this invention is relatively simple yet effective to a most startling degree. In general, it depends on the unusual and unexpected stability and solubility under particular acid conditions of cobaltic pentammine sulfate as compared to nickel pentammine sulfate. The process comprises first appropriately adjusting the ammonia and ammonium sulfate contents of the cobalt and nickel salts bearing liquor followed by oxidation thereof to convert the cobalt content from its cobaltous to its cobaltic state. By appropriate adjustment of the hydrogen ion concentration of the oxidized liquor, the nickel content originally in solution as pentammine sulfate can be substantially completely precipitated as nickel ammonium sulfate double salt leaving, after separation thereof, a substantially nickel-free cobalt-bearing solution.

So far as the present process is concerned the origin of the cobalt-nickel salts liquor to be treated is irrelevant. Methods are known whereby the nickel and cobalt content of various source materials such as ores, concentrates, plant by-products, and the like may be put into solution sufficiently free from extraneous metals and impurities associated therewith. Any of such processes may have been used to treat the source material resulting in the feed liquor being subjected to treatment according to the process of the present invention.

In general, the applicability of the present process is not limited to the treatment of liquors which initially contain the metals as salts of any particular acid. As mentioned above, however, the process depends upon the unique differences in stability at certain hydrogen ion concentrations of cobaltic and nickel pentammine sulfates and on the substantial insolubility of nickel ammonium sulfate under such conditions. The liquor at some stage, therefore, must be adjusted to provide sufficient sulfate ions to enable the separation to be effected. If the liquor is not already a sulfate liquor, this adjustment should be preferably made prior to oxidation since certain anions, as chloride, form insoluble cobaltic cations, for instance, cobaltic chloro pentammine.

The dissolved cobalt to nickel ratio of the original liquor is not particularly critical. Actually, it is a decided advantage of this invention that the process may be practiced on a liquor of any dissolved cobalt to nickel ratio with excellent results. Cobalt and nickel may be present in amounts providing high nickel-low cobalt ratios, high cobalt-low nickel ratios and in substantially equivalent amounts. The process, however, appears to be particularly effective when practiced on liquors the cobalt content of which ranges from about equivalent quantities of cobalt and nickel, up through those in which the cobalt content is predominant.

By "free ammonia" as used throughout this specification and claims is meant any ammonia dissolved in the liquor per se, as ammonium hydroxide, and any ammonia combined with the metals as metal-ammonia complex ions. The first step in the process comprises adjustment of the free ammonia content. This adjustment is necessary for several reasons. First, it is difficult to oxidize cobalt to its trivalent state when it is initially present as simple cobaltous ions. To affect the oxidation simply and completely, the cobalt must be in a complex ion form, i. e., as a cobaltous "ammine" complex. Such a complex "ammine" may be designated by the formula $Co(NH_3)_x$ in which $x$ may vary from just about one to as high as 6 and even higher. Secondly, the cobalt-nickel separation depends on the substantial stability and solubility in acid of certain complex cobaltic ammine salts, i. e., cobaltic pentammine sulfate, as compared to nickelous pentammine sulfate. Accordingly, sufficient free ammonia must be made available to form an oxidizable cobaltous ammine complex. In addition, this free ammonia should be sufficient to form metal-pentammine complexes of the dissolved cobalt plus nickel content. Accordingly, there must be provided at least about five mols of ammonia for each mol of dissolved nickel plus cobalt.

Cobalt, however, readily forms a hexammine complex in the presence of an excess of ammonia. A cobalt sulfate-nickel sulfate solution saturated with ammonia and subjected to oxidation and heating results in formation and precipitation of cobaltic hexammine sulfate as yellowish-orange crystals. The addition of ammonia, therefore, should be such as to form the acid stable cobaltic ammine salts of the dissolved cobalt content but not the highly insoluble cobaltic hexammine salt.

Ammonia may be added in any desired manner. It may, for instance, be added as a gas or it may be first dissolved in water and then added to the feed liquor. It may also be obtained from ammonium sulfate. When cobaltous cobalt as sulfate is oxidized, there is created a need for one-half a mol of additional sulfate ion per mol of cobalt. When this is obtained from dissolved ammonium sulfate, ammonia is freed. Accordingly, the necessary ammonia content may be derived from any or all of these sources.

As noted above, oxidation of cobalt creates a need for an additional one-half mol of sulfate anion per mol of cobalt over that needed for cobaltous and nickelous sulfate. Accordingly, there must be at least sufficient sulfate anions present to satisfy not only nickelous nickel, but cobalt in its cobaltic state. There must be available, therefore, at least three chemical equivalents of anions for each mol of cobalt and at least two chemical equivalents for each mol of nickel. This is best obtained by the addition of ammonium sulfate. Amounts of ammonium sulfate in excess of this requirement are not detrimental in any manner to the novel separation of this invention. In fact, high ammonium sulfate concentrations are advantageous in obtaining a greater nickel-free cobalt liquor as will be later pointed out.

Ammonium sulfate may be added as such. Alternatively, when treating liquors resulting from acid leaching systems, it may be completely or in part formed in situ by neutralizing the liquor with ammonia.

After appropriate adjustment, the solution is subjected to oxidation to convert cobaltous cobalt. Oxidation may be carried out at varying temperatures ranging as high as 100° C. and even higher. It is a decided advantage of this invention, however, that oxidation may be substantially completed at room temperature, thereby eliminating the use of high pressures and pressure equipment and rendering the process far more economical. Moreover, at higher temperatures, i. e. about 100° C. and higher, formation of insoluble cobaltic hexamine sulfate appears to be favored which results in a lowering of cobalt recovery.

The pressure of oxidizing gas and the length of treatment period required to obtain optimum results are functions of various factors and may vary quite widely. Accordingly, a general range of pressures and of operating periods cannot be accurately defined. They will vary, for instance, in accordance with the composition of the oxygen-bearing oxidizing gas, the manner and speed in which the gas is incorporated into the liquor, the manner in which the non-oxidizing components of the gas are vented, among other things. Both the pressure and time of oxidation, therefore, are not only functions of the particular oxidizing gas employed, but also of the apparatus in which treatment of the liquor is being conducted. The pressure of oxidizing gas required to obtain optimum results may best be described generally with respect to the liquor being treated. Thus, the pressure of oxidizing gas should be at least such as to provide sufficient oxygen to satisfy the stoichiometric requirements for converting substantially all dissolved cobalt from its cobaltous to cobaltic state. At the same time, however, it should not be such as to furnish oxygen sufficient to form substantial proportions of undesirable cobaltic peroxide.

Oxidized liquor containing cobaltic pentammine sulfate and nickelous pentammine sulfate is next subjected to an acidification and separation procedure to recover a substantially nickel-free cobalt liquor. In order to precipitate the dissolved nickel content, conditions of the oxidized liquor must be so adjusted as to favor stability and high solubility of the cobaltic pentammine sulfate. Under similar conditions nickel pentammine sulfate must be highly unstable with concurrent formation of highly insoluble nickel compounds. Neither cobaltous nor nickelous ammonium sulfate vary greatly in solubility between pH of about 1 to 7 although they appear to be less soluble at lower pH values. Cobaltic pentammine sulfate, on the other hand, is seriously affected by such a wide change in hydrogen ion concentration. Solubility of cobaltic pentammine sulfate greatly increases from a neutral solution toward acid and reaches a maximum at a hydrogen ion concentration equivalent to about a 2.0% aqueous sulfuric acid solution. At these greater hydrogen ion concentrations cobaltic pentammine sulfate is exceedingly soluble. Nickelous pentammine sulfate, however, is quite unstable and is neutralized to nickel and ammonium sulfates which precipitate as nickel ammonium sulfate.

While some precipitation of nickel ammonium sulfate may be obtained at pH's approaching neutral, precipitation to any appreciable extent does not occur until the pH approaches about pH 6. Excellent separation is obtained at pH's of 6 and lower with optimum results being obtained between a pH of about 2 (0.05% $H_2SO_4$ solution) and a hydrogen ion concentration equivalent to about a 2.0% aqueous sulfuric acid solution. At conditions more acid than this, the stability of cobaltic pentammine begins to decrease.

Accordingly, the hydrogen ion concentration of the solution is carefully adjusted by the addition of sulfuric acid. While the particular form in which sulfuric acid is added is not critical, it is important. In general, it is added in the form of about a 5% to about a 70% and preferably a 50% aqueous solution. While concentrations of acid higher than this may be readily employed, they hold out the definite possibility of violent reaction when added to the ammoniacal solution due to the heats created by dilution as well as by neutralization of the ammonia. More dilute solutions may likewise be employed. However, their use lowers the maximum cobalt to nickel separation, since whatever the concentration of nickel in solution, at reasonable ammonium sulfate concentrations, i. e., about ½ to about 1 mol per liter of liquor, the solubility of nickel cannot be lowered beyond about 1 gram per liter. Accordingly, the use of dilute acid solutions dilutes the metals content, particularly the cobalt content, while nickel solubility remains about the same, thus resulting in a decreased cobalt-nickel separation. Preferably, although not essential, about a 50% aqueous solution of sulfuric acid is used to adjust the hydrogen ion concentration of the oxidized liquor.

As noted above, nickel solubility cannot be decreased below about one gram per liter by acidification when the ammonium sulfate concentration of the liquor does not substantially exceed that necessary to satisfy oxidation. It is a feature of this invention, however, that where necessary or desirable, nickel solubility can be further decreased to give a cobalt liquor containing less nickel. This is conveniently done by increasing the ammonium sulfate content.

As previously stated, therefore, in discussion of the adjustment of the ammonia and ammonium sulfate concentrations of the initial liquor, it may be advantageous to add more ammonium sulfate than that necessary to satisfy oxidation. However, not until the ammonium sulfate content is about two mols per liter is there any appreciable decrease in the solubility of the nickel ammonium sulfate. Accordingly, to lower the solubility requires a high concentration of ammonium sulfate. In order to obtain a nickel solubility as low as about 0.1 gram per liter, for instance, this excess would amount to approximately 4.5 mols of ammonium sulfate per liter. Depending upon the initial cobalt to nickel ratio, therefore, it may in some cases be desirable and even necessary to decrease the nickel solubility by the addition of ammonium sulfate in order to obtain the desired degree of separation.

When treating liquors in which the cobalt content is not predominant, i. e., liquors having equivalent quantities of cobalt and nickel and in which nickel is predominant it may be necessary to decrease solubility of nickel ammonium sulfate to obtain the desired extent of separation. This may be done by adding ammonium sulfate at various stages of the process. For instance, ammonium sulfate concentration may be adjusted to the extent necessary during the initial adjustment prior to oxidation. On the other hand, the same adjustment may be made after oxidation prior to acidification and separation. When added at either of these two points in the process one nickel product will be taken comprising primarily nickel ammonium sulfate contaminated to a small extent with cobalt ammonium sulfate. Rather than adjusting the ammonium sulfate content prior to precipitation, the precipitation may be run in two stages. In the first stage the precipitation may be conducted without ammonium sulfate adjustment, other than that required initially, to separate a substantially cobalt-free nickel ammonium sulfate. This precipitation would be carried to the farthest extent possible to obtain a cobalt free product. Nickel ammonium sulfate precipitate may then be separated and residual liquor adjusted with respect to its ammonium sulfate content in order to further reduce the solubility of nickel to the extent desired. The resulting precipitate will be much smaller than the first and will contain cobalt ammonium sulfate as well as the remaining traces of nickel ammonium sulfate. Such a two-stage precipitation may be conducted regardless of initial metal ratio and without ammonium sulfate adjustment to obtain a substantially cobalt-free nickel ammonium sulfate product.

Precipitation is usually complete in about one hour. Preferably it is conducted with agitation. On completion of precipitation, precipitate is separated by filtration or other suitable mechanical means. Separated solids are collected and washed and washings preferably recycled. The nickel ammonium sulfate solids may then be sent to a recovery system for recovery of nickel metal powder. The particular method of recovery the nickel forms no part of this invention but may, for instance, comprise subjecting the solids in acid solution to a preferential nickel reduction with hydrogen.

The residual liquor resulting from nickel precipitation and separation comprises substantially nickel-free cobalt present to a large extent as cobaltic pentammine sulfate. This also may be treated in various ways, none of which forms any part of this invention, to recover the cobalt metal. It may for instance be subjected to gaseous reduction with hydrogen.

The following examples will further illustrate the invention. All parts are by weight unless otherwise noted.

EXAMPLE 1

A leach liquor containing 1.5 mols/liter of cobalt sulfate and 0.075 mol/liter of nickel sulfate adjusted to contain 7.5 mols/liter of ammonia and 1.3 mols/liter of ammonium sulfate is subjected to oxidation for one hour at room temperature and 150 p. s. i. g. of oxygen. The oxidized solution is divided into four equal samples and acidified to pH's of 4, 2, 1 and 0.5 with 50% aqueous sulfuric acid. Each sample is stirred for one hour, filtered and the residues washed twice with saturated ammonium sulfate solution. The results are tabulated in the following Table I.

Table I

| Sample | pH | Cobalt Product Liquor | | | |
| --- | --- | --- | --- | --- | --- |
| | | Co(g./l.) | Ni(g./l.) | Co/Ni | Co Yield (percent) |
| 1 | 4 | 78.91 | 0.13 | 630 | 84 |
| 2 | 2 | 82.27 | 0.13 | 660 | 87 |
| 3 | 1 | 77.66 | 0.16 | 478 | 83 |
| 4 | 0.5 | 66.35 | 0.13 | 510 | 71 |

To show the effect of oxygen pressure on the rate of oxidation, the following experiments were run.

EXAMPLE 2

The leach liquor of Example 1 is adjusted to contain ammonia and ammonium sulfate in ratios with combined dissolved metal of 7:1 and 1:1 respectively and oxidized at room temperature under 50 p. s. i. g. of oxygen. Oxidization of cobaltous cobalt is virtually complete in about 10 minutes.

EXAMPLES 3 and 4

Example 2 is repeated using oxygen pressures of 150 p. s. i. g. and 300 p. s. i. g. Oxidation is complete in about 3–4 minutes and about 1 minute respectively. However, at 300 p. s. i. g., cobalt ammine peroxide compounds comprise the major oxidation product.

To show the effect of ammonium sulfate on nickel and cobalt solubility, the following experiment is run.

EXAMPLE 5

A leach liquor containing 1 mol/liter of cobalt sulfate and 1/20 mol/liter of nickel sulfate is adjusted to an ammonia: nickel plus cobalt ratio of 4.5:1 and ammonium sulfate:nickel plus cobalt ratio of 0.7:1, and subjected to 50 p. s. i. g. of oxygen at room temperature for 10 minutes. Oxidized liquor is divided into three samples. The ammonium sulfate:nickel plus cobalt ratio of the first sample is left constant and the other two ad-

Table II

| Sample | Cobalt Liquor | | | | | Residue | | | |
|---|---|---|---|---|---|---|---|---|---|
| | $(NH_4)_2SO_4$:Me | Co (gm./l.) | Ni (gm./l.) | Co:Ni | Yield Co (Percent) | Wt. (gm.) | Co (Percent) | Ni (Percent) | Co:Ni |
| 1 | 0.7:1 | 52.03 | 0.53 | 99 | 87 | 39 | 9.89 | 4.77 | 2.06 |
| 2 | 1:1 | 44.27 | 0.14 | 316 | 74 | 82 | 11.43 | 2.85 | 4.01 |
| 3 | 2:1 | 41.38 | 0.11 | 375 | 69 | 78 | 13.02 | 2.50 | 5.22 | justed to 1:1 and 2:1 respectively. Each sample is then adjusted to a pH of 3 by addition of 50% aqueous sulfuric acid, stirred for one hour, filtered and residue washed with saturated ammonium sulfate solution. Results are shown in Table II.

EXAMPLE 6

A leach liquor adjusted to contain 0.1 mol/liter of nickel as nickel nitrate, 0.5 mol/liter of cobalt as cobalt nitrate, 2.5 mol/liter of ammonia and 1 mol per liter of ammonium nitrate is oxidized at room temperature with 50 p. s. i. g. of oxygen for 15 minutes. One mol/liter of $(NH_4)_2SO_4$ is added and the liquor heated to 90° C. On adjustment of the pH to 2 by addition of 50% $H_2SO_4$ and stirring for one hour, crystals of nickel ammonium sulfate precipitated leaving a solution of cobaltic pentammine sulfate.

I claim:

1. A hydrometallurgical process for recovering a substantially nickel-free cobalt solution from a liquor containing dissolved nickel and cobalt which comprises: adjusting the solutes content of said liquor to provide about 5 mols of ammonia for each mol of dissolved cobalt plus about 5 mols of ammonia for each mol of dissolved nickel and a sulfate ion concentration at least sufficient to satisfy the dissolved cobalt content in its trivalent state and dissolved nickel in its bivalent state; oxidizing the adjusted liquor with a sulfur-free, oxygen-bearing oxidizing gas; introducing sulfuric acid into said oxidized liquor to produce a hydrogen ion concentration at least equivalent to a pH of about 4, whereby a substantially cobalt-free, nickel-bearing precipitate is formed; and separating said precipitate leaving a substantially nickel-free, cobalt-bearing liquor.

2. A process according to claim 1 in which ammonium sulfate is added to the substantially nickel-free cobalt liquor and the resultant precipitate separated.

3. A process according to claim 1 in which the hydrogen ion concentration is adjusted to a range equivalent from about 0.05% to about 2.0% sulfuric acid solution.

4. A process according to claim 1 in which oxidation is conducted at about room temperature.

References Cited in the file of this patent

UNITED STATES PATENTS

| 2,531,336 | Hills et al. | Nov. 21, 1950 |
| 2,576,314 | Forward | Nov. 27, 1951 |
| 2,588,265 | McGauley | Mar. 4, 1952 |
| 2,647,820 | Forward | Aug. 4, 1953 |
| 2,647,827 | McGauley | Aug. 4, 1953 |
| 2,647,828 | McGauley | Aug. 4, 1953 |

OTHER REFERENCES

Mellor: "Comprehensive Treatise on Inorganic and Theoretical Chemistry," vol. 14, 1935, published by Longmans, Green and Co., New York; pages 440, 441 and 444.